United States Patent [19]

Shiomi et al.

[11] Patent Number: 4,693,597

[45] Date of Patent: Sep. 15, 1987

[54] DISTANCE MEASURING DEVICE WITH SIGNAL PROCESSING CIRCUIT FOR POSITION SENSITIVE DETECTOR

[75] Inventors: Yasuhiko Shiomi, Tokyo; Ryoichi Suzuki, Kanagawa, both of Japan

[73] Assignee: Canon Kabushiki Kaisha, Japan

[21] Appl. No.: 583,755

[22] Filed: Feb. 27, 1984

[30] Foreign Application Priority Data

Mar. 2, 1983 [JP] Japan .................................. 58-34291

[51] Int. Cl.$^4$ ............................. G01C 3/24; G01J 1/20
[52] U.S. Cl. ........................................ 356/1; 354/403; 250/201
[58] Field of Search ............... 356/1, 4; 354/403, 402; 250/201 AF

[56] References Cited

U.S. PATENT DOCUMENTS

| | | | |
|---|---|---|---|
| 4,436,418 | 3/1984 | Morino | 354/403 X |
| 4,445,029 | 4/1984 | Nagaoka et al. | 356/1 X |
| 4,477,168 | 10/1984 | Hosoe | 354/403 |
| 4,479,706 | 10/1984 | Takahashi | 354/403 |
| 4,521,106 | 6/1985 | Lambeth | 356/1 |
| 4,527,892 | 7/1985 | Yamane et al. | 354/403 X |

Primary Examiner—Stephen C. Buczinski
Assistant Examiner—Linda J. Wallace
Attorney, Agent, or Firm—Toren, McGeady & Associates

[57] ABSTRACT

The disclosed position measuring device includes a position sensitive detector and a processing circuit therefor. The position sensitive detector includes two terminals carrying signals that vary oppositely according to the incident light. A switch connected to one terminal opens and closes the one terminal, and a signal processor processes one output of the position sensitive detector when the switch is opened and another output of the position sensitive detector when the switch is closed so as to produce normalized light/point position information. A control controls the signal processing circuit and the switch.

12 Claims, 9 Drawing Figures

DISTANCE MEASURING DEVICE WITH SIGNAL PROCESSING CIRCUIT FOR POSITION SENSITIVE DETECTOR

2. Description of the Prior Art

Proposals have been made for various distance measuring devices operating on the principle of trigonometric measurements. In such prior art devices, a photo-sensitive element and a light measuring element are spaced from each other along a base line. A scene to be photographed is scanned by changing the angle of the axis of one of these elements relative to the other from an angle representing the closeup position to an angle representing infinity. The distance to an object is obtained from the base length and the angle at which the largest amount of light is received by the photo-sensitive element.

Cameras using such devices are generally focused by turning the distance ring of a photo-taking lens. Therefore, applying the aformentioned distance measuring system to an automatic focusing arrangement of a camera involves interrelating the rotation of the distance ring of the photo-taking lens with the scanning action of the photo-sensitive element or the light projecting element and stopping the rotation of the distance ring of the photo-taking lens when the quantity of light received by the photo-sensitive element reaches a maximum value. This results in a structurally simple automatic focusing system. However, because the system requires mechanical scanning with either the light projecting element or the photo-sensitive element, it still involves a complex a-sortment of mechanical parts. Also, it is difficult precisely to correlate the rotation of the distance ring of the photo-taking lens with the scanning operation of the photo-sensitive or light projecting element. The system requires not only high precision mechanical parts but necessitates troublesome adjustments.

To solve this proble, a proposal has been made to replace the mechanically scanning photo-sensitive or light projecting element with a number of photo-sensitive elements whose outputs are electrically scanned to obtain distance measurement information. However, accurate distance measurement demands the use of many photo-sensitive elements. This results not only in increased cost but an extremely complex computing system for processing the output of the photo-sensitive elements.

Another arrangement has been proposed in Japanese Laid-Open Patent Application No. SHO 57-44809. Here, the reflection resulting from light emitted by a light projecting element is received by a position sensitive detector (hereinafter called PSD). Information concerning the incidence of the reflected light is obtained from a signal representing the difference between two outputs of the PSD. Measured information is thus obtained from the incident position. Accurately correlating the difference signal to the measured signal requires making the sum of the two outputs of the PSD unvarying by minimizing the influence of the external light thereon. Therefore, the light to be emitted from the light projecting element is pulse modulated and a feedback control is applied to the light projecting element such that the quantity of light to be emitted by the light projecting element increases to keep the sum signal of the two outputs constant in the event of small outputs from the PSD. However, applying this proposal in Japanese Laid-Open Patent Application No. SHO 57-44809 to a distance measuring device requires use of a complex circuit for feedback control over the light projecting element. If the photographic object is located a long distance away or has a low reflection factor, the output of the light projecting element must be increased through the feedback control. Therefore, the light projecting element may consume a large amount of electrical energy.

Another proposal atttempts to solve this problem. Here the distance signal is normalized by dividing either the differential signal of the two output signals of the PSD, or one of the two output signals, by the sum signal of the two output signals to produce a highly accurate distance measurement signal which is independent of the reflection factor of the object to be photographed. This proposal obviates the necessity of the aforementioned feedback control and permits simplification of the circuit arrangement in the previous proposal. However, it is still necessary to compute the sum signal of the two outputs. Therefore, each of the two outputs must be signal processed individually. This not only complicates the circuit but also results in an increased number of processes for adjusting the circuit.

Yet another proposal attempts to eliminate this shortcoming. This appears in Japanese Laid-Open Patent Application No. SHO 57-175904. Here, the distance signal is normalized by obtaining the sum signal from a common electrode or bias electrode of the PSD. However, then one of the two output terminals of the PSD and the common electrode both require their own signal processing circuits for normalization of the distance signal. This results in complex circuitry. The signal processing circuitry becomes especially complicated with a position measuring device using two-dimensional PSD. This is so because two pairs of signal processing circuits are needed to produce the signals from two output terminals along the X and Y axes.

With a PSD or other photo-sensitive element that receives light emitted by a light projecting element and reflected by an object, a signal corresponding to the position at which the reflected light is received can be produced if the light striking the PSD consists only of light reflected by the object. However, an automatic focusing system using a photo-sensitive element like a PSD is generally used under various types of circumstances. The ambient light extraneous to the light emitted by the light projecting element is likely to be much greater than the level of the light of the light projecting element reflected by the object to be photographed. This is particularly so in daylight photography.

A PSD is fundamentally a kind of photo-sensitive element that produces a photo current corresponding to the quantity of light incident thereon. Therefore, where the level of the ambient light is much higher than that of the light of the light projecting element reflected by the object, the level of the photo current resulting from the ambient light is much higher than the photo current corresponding to the light originating in the projecting element and reflected by the object. The photo current arising from ambient light is considered to be noise. Hence, in the aforementioned situation, the output current of the PSD represents a signal of such poor S/N ratio so that it scarcely allows extraction of only the light component originating from the light projecting element and reflected by the object to be photographed. Thus, some suitable countermeasures would be necessary.

Japanese Laid-Open Patent Application No. SHO 57-182112 proposes extracting only the photo current component corresponding to the reflected light originating in the light projecting element. There, the level of the photo current generated by the PSD by ambient light is stored in advance. Thereafter, the projecting element lights up the object. Then, a direct current suppression circuit suppresses the direct current by using the stored photo current level to offset the photo current produced both by the light reflected from the object and the ambient light. This produces a signal coresponding solely to a photo current arising from the light reflected by the object in response to emission from the projecting element. However, the proposal in Japanese Laid-Open Patent Application No. SHO 57-182112 is deficient in failing to define the timing of the storage of the level of the photo current generated at the PSD in response to ambient light. Also, the two output terminals of the PSD are both provided with direct current suppression circuits. This also results in a complex circuit arrangement.

SUMMARY OF THE INVENTION

It is a first object of the present invention to provide a novel PSD signal processing circuit which is capable of eliminating the shortcomings of the above-stated PSD signal processing circuit of the prior art.

Under this object, it is a second object of the invention to provide a PSD signal processing circuit of a simplified structural arrangement in which, in the case of a one-dimensional PSD, a switching element is provided at one of two terminals of the PSD; the switching element is turned on and off in time series in such a manner that a signal produced from the other terminal when both the two terminals are not open and a sum signal representing the sum of two signals produced from the two terminals are obtained in a time serial manner, so that the sum signal of the PSD can be obtained without recourse to a computing circuit.

Further, under the first object, it is a third object of the invention to clarify the optimum timing at which the level of a photo current generated due to ambient light at the PSD is to be stored in a PSD signal processing circuit arrangement including a direct current suppression circuit.

Further, under the first object, it is another object of the invention to provide a PSD signal processing circuit in which: A switching element is provided at one of two terminals of the PSD; the switching element is arranged to be turned on and off in time series in such a manner that a signal produced from the other terminal when both the two terminals are not open and a sum signal representing the sum of two signals produced from the two terminals are obtained in a time serial manner; the PSD signal processing circuit includes a single direct current suppression circuit arranged to offset or cancel a signal which result from ambient light and produced from the other terminal; and the level of the ambient light stored at the direct current suppression circuit is stored again according to turning on and off of the switching element, so that the direct current suppression of the ambient light level can be more accurately carried out.

These and further objects and features of the invention will become more apparent from the following detailed description of preferred embodiments thereof taken in connection with the accompanying drawings.

DETAILED DESCRIPTION OF THE PREFERRED EMBODIMENTS

Figure 1:
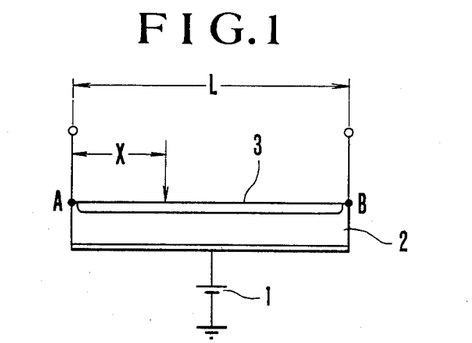
FIG. 1 is a circuit diagram showing the operating principle of the PSD.
Figure 2:
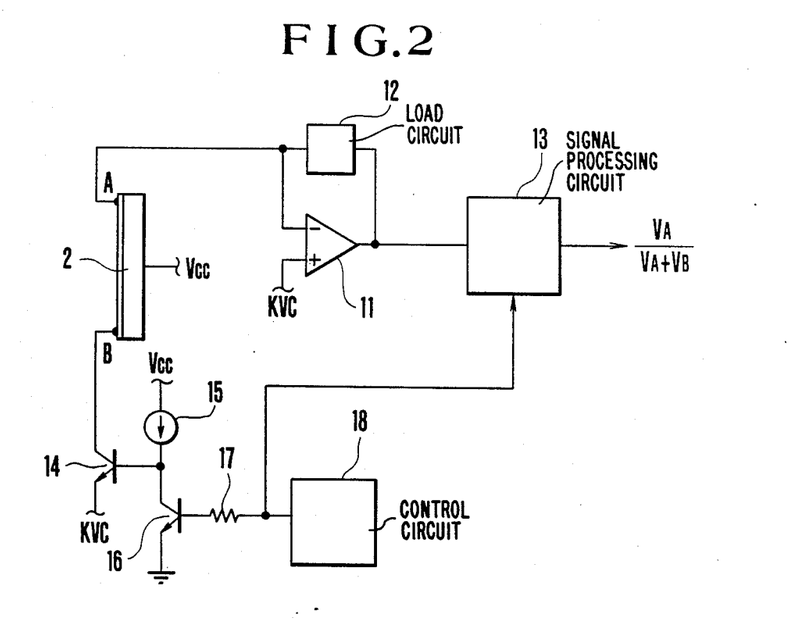
FIG. 2 is a circuit diagram showing the arrangement of a first embodiment of the present invention.

Referring to FIGS. 1 and 2, the circuit arrangement of the first embodiment of the invention includes a biasing battery 1; a PSD 2 which is provided with two electrodes A and B; the light receiving surface 3 of the PSD 2; an operational amplifier 11 which forms a current-to-voltage converting amplifier in conjunction with a load circuit 12 and is arranged to receive a signal from the electrode or terminal A of the PSD 2; a signal processing circuit 13 which includes storage and computing means and is arranged to normalize the signal of the PSD 2; a switching transistor 14 which has its collector connected to the terminal B of the above-stated PSD 2 and its emitter to a reference voltage source KVC; a constant current circuit 15; a switching transistor 16 which has its collector connected to the base of the above-stated transistor 14; and a control circuit 18 which drives the transistors 14 and 16 to time serially open the terminal B of the PSD 2 and is arranged to have the signal processing circuit 13 thus driven thereby.

The PSD 2 which is shown in FIG. 1 is arranged as follows: Upon receipt of incident light on the light receiving surface 3, the PSD 2 generates a photo current I. Then, two signal currents IA and IB which are arranged to be in a relation of IA+IB=I are produced at the electrodes or terminals A and B. The photo current I increases as the quantity of light incident on the PSD increases. Assuming that the distance between the electrodes or terminals A and B of the PSD is L and the distance from the electrode A to a light receiving point is x, and using the photo current I generated at the light receiving point since the light receiving surface 3 is made of a homogeneous registance material, the signal currents IA and IB can be expressed as follows:

$$IA = I \times \frac{L-x}{L} ; \text{ and } IB = I \times \frac{L-x}{L}$$

The currents IA and IB produced at the electrodes A and B thus become the functions of the position of the light receiving point. With the quantity of the incident light unvarying and the photo current I constant, the position of the incident light receiving point can be found to permit distance measurement thereby.

Referring further to FIG. 1, when one of the paired electrodes A and B is opened, the whole of the photo current I (=IA+IB) generated due to the light incident on the light receiving surface 3 is produced at the other electrode.

The embodiment which is arranged as shown in FIG. 2 operates as follows: When the output of the control circuit 18 is at a high level, the switching transistor 16 turns on. The output of the constant current circuit 15 flows to the transistor 16. This causes the other transistor 14 to turn off and thus brings the terminal B of the PSD 2 into an open state. As a result of that, the terminal or electrdde A of the PSD 2 produces the signal current IA together with another signal current IB which is to be produced from the other terminal B if the terminal B is not in the open state with the latter superimposed on the current IA. In other words, a sum signal is produced in this instance from the terminal A. This signal is converted into a voltage and amplified by the operational amplifier 11 and the load circuit 12. The signal thus amplified is latched an stored as a sum signal (VA+VB) at the signal processing circuit 13.

Next, when the output level of the control circuit 18 becomes a low level, the switching transistor 16 turns off. Then, the output of the constant current circuit 15 causes the switching transistor 14 to turn on. Accordingly, unlike the case when the output of the control circuit 18 is at a high level, the signal current IA alone is produced from the terminal A of the PSD 2 while the other signal current IB from the terminal B flows via the switching transistor 14 to the reference voltage source KVC. The signal current IA is current-to-voltage converted and amplified by the operational amplifier 11 and the load circuit 12 before it is supplied to the signal processing circuit 13. Then, the output of the control circuit 18 causes the signal thus supplied to the signal processing circuit 13 to be computed with the sum signal (VA+VB) which has been latched when the output of the control circuit 18 is at the high level. Through this computation, the signal processing circuit 13 produces a signal which is corresponding to the incident position of the PSD 2 and is obtained by a normalizing process of VA/(VA+VB).

As will be understood from the above description, unlike the prior art arrangement, the embodiment obviates the necessity to provide the terminals A and B of the PSD 2 respectively with signal processing circuits. In accordance with the embodiment, it suffices to provide only one of the terminals A and B with the signal processing circuit.

Figure 3:
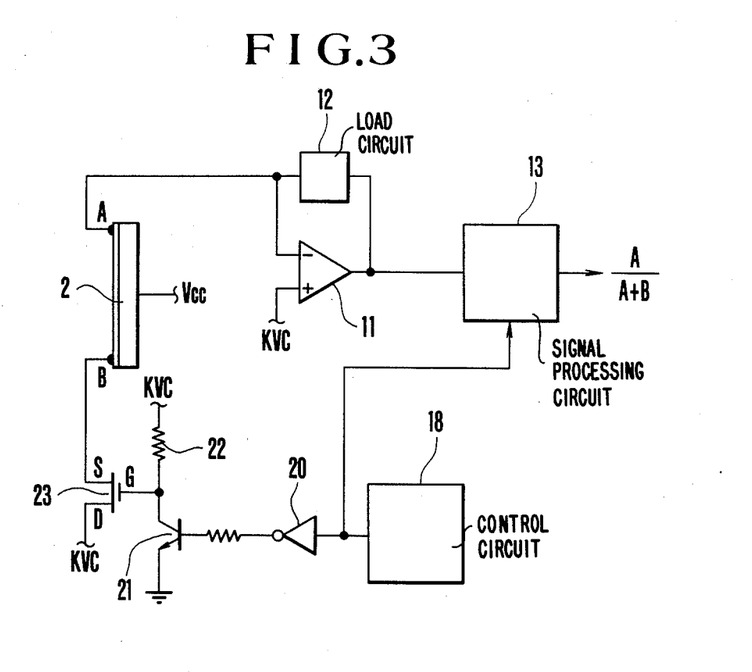
FIG. 3 is a circuit diagram showing a second embodiment of the invention.

FIG. 3 shows the arrangement of another embodiment of the invention (a second embodiment). In FIG. 3, the elements operating in the same manner as the corresponding elements of FIG. 2 are indicated by the same reference numerals and symbols and are omitted from the following description: In this case, the switching transistor 14 of FIG. 2 is replaced with an enhancement type MOS-FET 23 of P channel. The source of the MOS-FET 23 is connected to the terminal B of the PSD 2 and the drain thereof to the reference voltage source KVC. In case that the output of the control circuit 18 is at a high level, the output level of an inversion circuit 20 becomes a low level. A switching transistor 21 turns off. The gate voltage of the MOS-FET 23 rises up to a reference voltage KVC. The MOS-FET 23 thus turns off. Conversely, when the output level of the control circuit 18 is at a low level, the output level of the inversion circuit 20 becomes a high level to turn on the switching transistor 21. This causes the gate voltage of the MOS-FET 23 to drop approximately to the level of the ground. The MOS-FET 23 thus turns on. The manner in which the signal currents from the PSD 2 are processed in the subsequent stage is identical with the first embodiment shown in FIG. 2 and, therefore, is omitted from description here.

Figure 4:
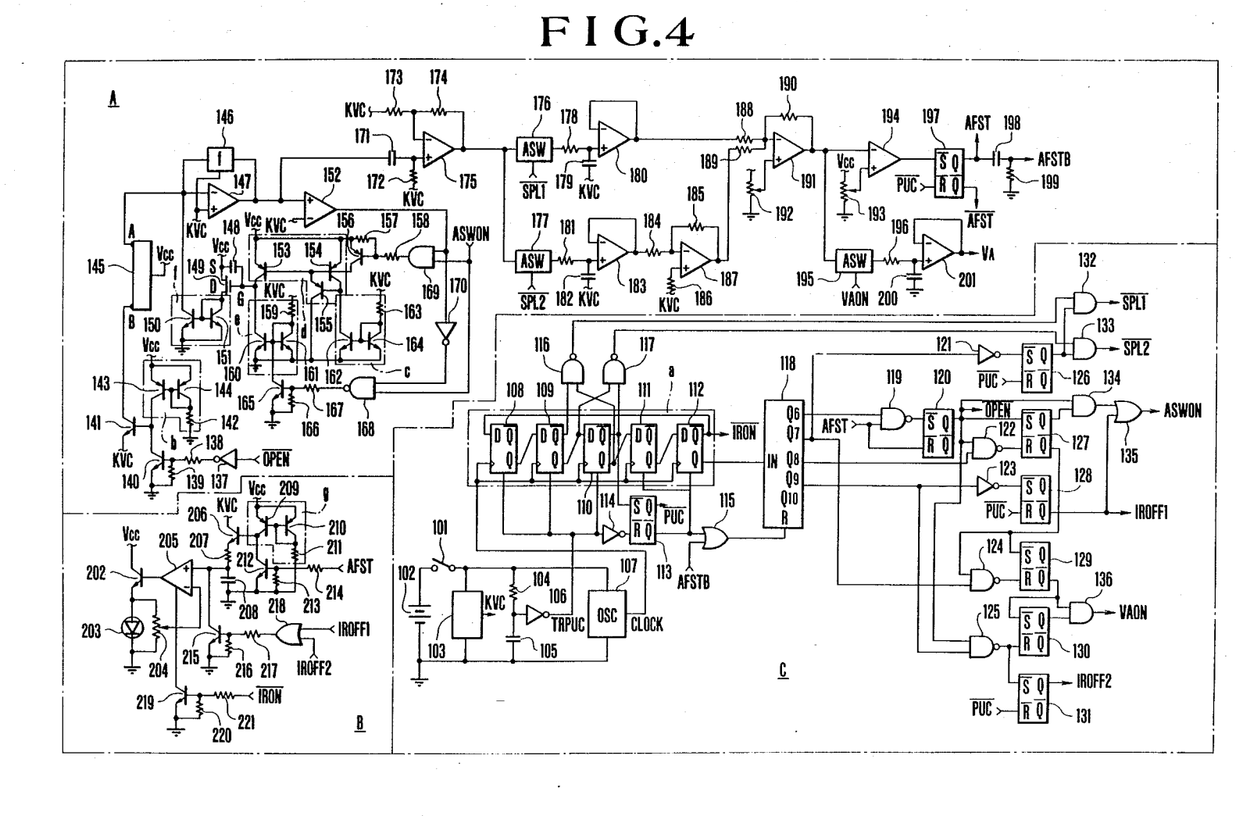
FIG. 4 is a circuit diagram showing a third embodiment of the invention.

A third embodiment of the invention is arranged as shown in FIG. 4. The operation of the third embodiment is as shown in time charts in FIGS. 5 and 6.

Referring to FIG. 4, the third embodiment consists of a light receiving part-and-signal processing system A; a light projecting system B and a digital control system C.

The digital control system C includes a power source switch 101 which is provided for a power source 102 and is arranged to turn on in response to a depressing operation on a shutter release button of a camera; a reference voltage KVC generating circuit 103; a resistor 104; and a capacitor 105. These elements jointly form a generator for generating an initial reset pulse TRPUC. The digital control system C further includes an inverter 106; an oscillator 107 which generates fundamental pulses for the digital control system; a Johnson counter "a" which is composed of D flip-flops 108, 109, 110, 111 and 112 (hereinafter will be called D-FF's for short); an RS flip-flop 113 (hereinafter will be called RS-FF for short) which is arranged to produce a clear signal when the power supply is switched on; an inverter 114 which inverts the initial reset pulse TRPUC and supplies it to the reset terminal $\overline{R}$ of the RS-FF 113; an AND gate 115 which takes the AND of an operation suspending pulse signal AFSTB (will be described later) and a signal produced from the inversion output terminal Q of the RS-FF 113 and is connected to the reset terminal of a counter 118 (which will be described later); and NAND gates 116 and 117 which are arranged to take the NAND of the outputs of the output terminals Q and inversion output terminals $\overline{Q}$ of the D-FF's 109 and 110 which form the Johnson counter "a". In the digital control system C, a binary counter 118 is provided with a count input terminal IN, a reset terminal R and output terminals Q6–Q10. The output terminal Q6 is arranged to produce a signal formed by frequency dividing into $2^6$ divisions the output pulse signal of the Johnson counter "a" applied to the count input terminal IN. Ohter output terminals Q7, Q8, Q9 and Q10 are arranged to produce signals obtained by frequency dividing the output pulse signal of the Johnson counter "a" respectively into $2^7$, $2^8$, $2^9$ and $2^{10}$ divisions. A NAND gate 119 is arranged to produce the NAND of the signal produced from the terminal Q6 of the binary counter 118 and an operation completion signal AFST. An RS-FF 120 has its input terminal $\overline{S}$ connected to the output terminal of the NAND gate 119 and its input terminal $\overline{R}$ arranged to receive the operation completion signal AFST. The operation completion signal AFST is arranged to be produced from the terminal Q of the RS-FF 120. A PSD terminal open signal $\overline{OPEN}$ is arranged to be supplied to NAND gates 122 and 125 and the terminal $\overline{S}$ of an RS-FF 127. An inverter 121 is arranged to invert the signal produced from the terminal Q7 of the binary counter 118 and to produce it to the terminal $\overline{S}$ of an RS-FF 126. The NAND gate 122 produces a NAND output obtained from the signal of the terminal Q8 of the binary counter 118 and the signal of the terminal Q of the RS-FF 120 and supplies it to the terminal $\overline{R}$ of an RS-FF 127. An inverter 123 inverts the signal produced from the terminal Q9 of the binary counter 118 and produces the inverted signal to the terminal $\overline{S}$ of an RS-FF 128. A NAND gate 124 produces a NAND output obtained from the signal of the terminal Q7 of the binary counter 118 and the signal of the inversion output terminal $\overline{Q}$ of the RS-FF 127 and supplies it to the terminal R of an RS-FF 129. Another NAND gate 125 produces a NAND output obtained from the signal of the terminal Q9 of the binary counter 118 and the signal of the terminal Q of the RS-FF 120 and supplies it to the terminal R of an RS-FF 130. An AND gate 132 produces an AND output obtained from the signal of the NAND gate 116 and that of the terminal Q of an RS-FF 126 as a first sample-and-hold signal $\overline{SPL1}$. An AND gate 133 produces an AND output obtained from the signal of the NAND gate 117 and that of the terminal Q of the RS-FF 126 as a second sample-and-hold signal $\overline{SPL2}$. Another AND gate 134 produces an AND output obtained from the outputs of the RS-FF 120 and RS-FF 127 to one of the input terminals of an OR gate 135. To the other input terminal of the OR gate 135 is supplied a signal produced from the terminal $\overline{Q}$ of the RS-FF 128 as a first iRED arc-suppressing signal iROFF1 which will be described later herein. The OR output of the OR gate 135 becomes a direct current suppression instruction signal ASWON which will be described later. An AND gate 136 receives a signal from the terminal $\overline{Q}$ of the RS-FF 129 and a signal from the terminal Q of the RS-FF 130 and produces a VA hold instruction signal VAON which will be also described later. An RS-FF 131 has the output of the NAND gate 125 supplied to its terminal S and a power-up-clear signal $\overline{PUC}$ to its terminal R and produces from its terminal Q a second iRED arc-suppressing signal iROFF2.

The light receiving part-and-analog processing system A includes a switching transistor 141 which performs a switching action on a current flowing from the terminal B of the PSD 145; transistors 143 and 144 and a resistor 142 which form a Miller circuit "b" and are arranged to drive the switching transistor 141 with the output current of the Miller circuit "b"; a transistor 140 is arranged to be switched by a PSD terminal open signal $\overline{OPEN}$ coming via an inverter 137 and to control the output current of the Miller circuit "b" which is flowing to the transistor 141; and a feedback circuit 146 of an operational amplifier 147. A reference numeral 149 denotes a P-channel MOS-FET. A current Miller circuit "f" is formed by transistors 150 and 151. The MOS-FET 149 performs direct current suppression for a current flowing to the transistor 150 by controlling a current flowing through the transistor 151. A comparator 152 is arranged to detect arrival of the output of the operational amplifier 147 at a given level for the purpose of preventing the output from exceeding the given level. The output voltage of the operational amplifier 147 is supplied to the non-inversion input terminal of the comparator 152 while the reference voltage KVC is supplied to the inversion input terminal of the comparator 152. A Miller circuit "d" is formed by transistors 153 and 154. A transistor 156 is arranged to control the current of the Miller circuit "d" by performing a switching action between the emitter and base of the transistors 153 and 154 of the Miller circuit "d". Another Miller circuit "e" is formed by a resistor 159 and transistors 160 and 161. A transistor 165 is arranged to control the current of the Miller circuit "e" by performing a switching action between the base and emitter of the transistors 160 and 161 in the same manner as the transistor 156. A resistor 163 and transistors 162 and 164 form a Miller circuit "c". A NAND gate 168 is arranged to produce a NAND output obtained from a direct current suppression instruction signal ASWON and the output of the comparator 152 which comes via an inverter 170. An AND gate 169 is arranged to produce an AND output obtained from the direct current suppression instruction signal ASWON and the output of the comparator 152. The AND output of the AND gate 169 is supplied to the base of the transistor 156. A capacitor 171 is arranged for the purpose of blocking a DC component. An operational amplifier 175 is arranged to amplify an input signal thereto to a suitable value determined by the values of resistors 172, 173 and 174. Elements 176 and 177 are analog switches ASW which are arranged to be driven respectively by a first sampling signal $\overline{SPL1}$ and a second sampling signal $\overline{SPL2}$. When a light emitting element iRED which will be described later is alight, the level of the signal $\overline{SPL1}$ becomes low. The level of the other signal $\overline{SPL2}$ becomes a low level when the light emitting element iRED is not alight. A circuit formed by a resistor 178, a capacitor 179 and a buffer amplifier 180 and another circuit formed by a resistor 181, a capacitor 182 and a buffer amplifier 183 respectively represent peak holding circuits. The output of the buffer amplifier 183 is supplied to an inversion circuit formed by resistors 184, 185 and 186 and an operational amplifier 187. A signal produced from the operational amplifier 183 is inverted by this inversion circuit and is subjected to an addition operation performed jointly by resistors 188, 189 and 190, a variable resistor 192 and an operational amplifier 191. The output terminal of the operational amplifier 191 is connected to the inversion input terminal of a comparator 194. An RS-FF 197 is set when the power supply is switched on to prevent a low level signal from entering the set input terminal $\overline{S}$ of the RS-FF 197 for the purpose of preventing the level of an AF action suspending signal $\overline{AFST}$ from becoming a high level. In other words, the input level for the non-inversion input terminal of the comparator 194 is determined by means of the variable resistor 193 in such a way as to make the output level of the comparator 194 high. An analog switch ASW 195 is arranged to perform a switching operation according to a VA holding signal VAON. The output signal of the analog switch ASW 195 is produced via a resistor 196 to be held by a capacitor 200 and is then produced after it is normalized into a position signal VA via a buffer 201.

In the light projection system B, a transistor 202 is controlled by the output of an operational amplifier 205 which is arranged to control the light projection output of a light emitting element iRED 203. The strobe terminal of the operational amplifier 205 is connected to the collector of the transistor 219. The transistor 219 has a light emission signal RON/ supplied via a resistor 221 to the base thereof. In other words, when the signal $\overline{iRON}$ is at a high level, that is, when the iRON is at a low level, the transistor 219 turns on to cause the strobe terminal to turn on. Therefore, the operational amplifier 205 does not produce any signal and the transistor 202 turns off. Transistors 209 and 210 and a resistor 211 form a Miller circuit "g". When the transistor 212 is off, that is, before the signal $\overline{AFST}$ which is produced from the inversion output terminal $\overline{Q}$ of the RS-FF 197 of the light receiving part-and-signal processing system A becomes a high level, that is, before the output of the PSD 145 reaches a predetermined level, the output current of the Miller circuit "g" flows to the base of a transistor 206 to turn on the transistor. A series circuit of a resistor 207 and a capacitor 208 is a time constant circuit which is arranged to be turned on and off by the transistor 206. A transistor 215 is driven by the output of an OR gate 218 to cause the capacitor 208 to make a discharge.

Figure 5:
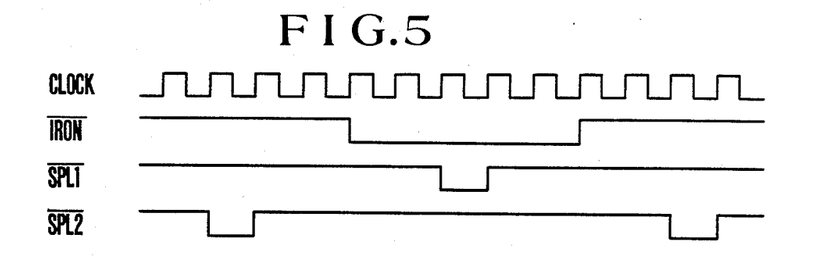
FIGS. 5 and 6 are time charts showing the operation of the third embodiment of the invention.
Figure 6:
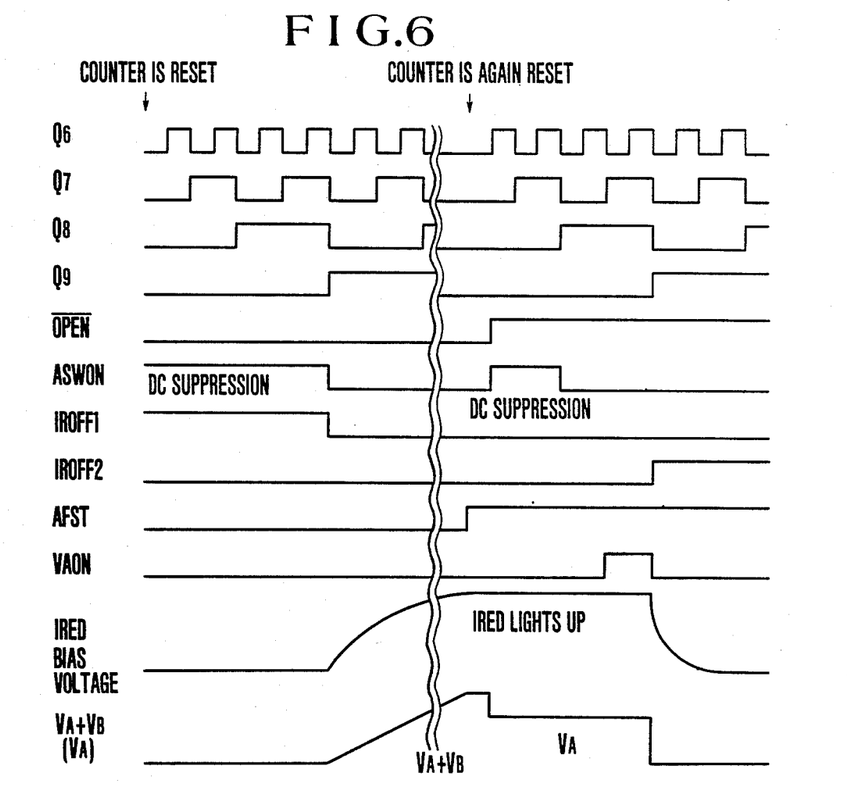

Referring to the time charts of FIGS. 5 and 6, the third embodiment which is arranged as described in the foregoing operates as follows: Power supply is effected from the power source battery 102 to each circuit when the switch 101 is closed. The reference voltage KVC from the reference voltage generating circuit 103 is supplied to each applicable terminal. Further, through the resistor 104, the capacitor 105 and the inverter 106, the initial reset pulse signal TRPUC comes to reset the D-FF's 108, 109 and 110. At the same time, the signal TRPUC also resets the RS-FF 113 via the inverter 114. The output terminal Q of the RS-FF 113 then produces the signal $\overline{PUC}$ and, with the terminal $\overline{Q}$ thereof at a high level, the D-FF's 111 and 112 are initially reset. The RS-FF's 126, 128, 131 and 197 are reset by the signal $\overline{PUC}$. The inversion output $\overline{Q}$ of the RS-FF 113 resets the binary counter 118 via the OR gate 115. At the same time, with the signal $\overline{PUC}$ coming to the reset terminal $\overline{R}$ of the RS-FF 197, the level of the output of the terminal Q, i.e. the output AFST of the RS-FF 197, becomes a low level. Therefore, the output of the NAND gate 119 is at a high level. Accordingly, the RS-FF 120 is not set and the output of the terminal Q is at a low level. The PSD terminal open signal $\overline{OPEN}$ is thus at a low level. Therefore, the transistor 140 is caused via the inverter 137 to turn on. The current of the Miller circuit "b" flows to the transistor 140. The transistor 141 is off and the terminal B of the PSD 145 is opened. As a result, the whole of the photo current of the PSD 145 which is generated, in this instance, due to ambient light flows out of the terminal A of the PSD 145. The output current of the PSD 145 comes to the inversion input terminal of the operational amplifier 147 and is converted into a voltage by the feedback system 146. The level of the output of the operational amplifier 147 becomes lower than the input reference voltage KVC of the non-inversion input terminal of the comparator 152. The output level of the comparator 152 thus becomes low. On the other hand, the output $\overline{Q}$ of the RS-FF 128 which has been reset by the signal $\overline{PUC}$ is at a high level. Therefore, the output ASWON which comes through the OR gate 135 is at a high level. This causes the output levels of the AND gate 169 and NAND gate 168 to become low. Accordingly, the transistor 156 turns on. No current flows to the Miller circuit "d". The output of the NAND gate 168 is applied via the resistors 166 and 167 to the transistor 165. The transistor 165 therefore turns off. The Miller circuit "e" begins to operate. The capacitor 148 is then charged with the output current of the Miller circuit "e" in the direction opposite to the power source voltage VCC. A voltage VSG between the source and gate of the FET 149 becomes higher according as the charging process on the capacitor 148 progresses. The drain current of the FET 149 increases and comes to flow via the Miller circuit "f". The output current of the PSD 145 begins to flow to the Miller circuit "f" by virtue of the operation of the Miller circuit "f". When the charging process on the capacitor 148 further progresses, the output current of the PSD 145 further flows to the Miller circuit "f". This causes via the feedback system 146 the output of the operational amplifier 147 to become higher than the voltage KVC. The output of the comparator 152 changes from a low level to a high level. As a result of that, the output levels of both the NAND gate 168 and the AND gate 169 become high. The transistor 165, therefore, turns on to turn off the Miller circuit "e". Further, since the transistor turns off, the Miller circuit "d" begins to operate. The output current of the Miller circuit "d" flows to another Miller circuit "c". The capacitor 148 then begins to discharge. This results in a lower voltage VSG between the source and gate of the FET 149. The rate of the output current of the PSD 145 flowing to the Miller circuit "f" then decreases. In other words, a feedback action is performed on the operational amplifier 147. This feedback action brings a current flowing to the feedback system 146 of the operational amplifier 147 closer to nought. By this control arrangement, the amplifier which is arranged to operate at the initial stage is effectively prevented from being saturated by the output current of the PSD 145 and particularly by the output current resulting from ambient or background light. With the count by the binary counter 118 having progressed when the level of the terminal Q9 of the binary counter 118 becomes high, the RS-FF 128 is set and the level of its output $\overline{Q}$ becomes low. The level of the signal ASWON also becomes low. As a result, the output level of the AND gate 169 becomes low and that of the NAND gate 168 high. The Miller circuits "d" and "e" cease to operate. The capacitor 148 ceases to be charged and ceases to discharge. After that, a given amount of the output current of the operational amplifier 147 corresponding to a voltage latched and stored at the capacitor 148 flows via the Miller circuit "f". At that time, a high level signal is produced from the output terminal Q9 of the binary counter 118. This causes the output $\overline{Q}$ of the RS-FF 128, i.e. the signal iROFF1 to change from a high level to a low level. Thus, the levels of both the signals iROFF1 and iROFF2 become low. The output level of the OR gate 218 becomes low. The transistor 215 turns off. Since the signal AFST is at a low level on the other hand, it causes the transistor 212 to turn off via the resistors 213 and 214. Then, the output current of the Miller circuit "g" flows all to the base of the transistor 206 to turn on the transistor. With the transistor 206 thus turned on, the capacitor 208 is charged via the resistor 207. The terminal voltage of the capacitor 208, i.e. the voltage of the non-inversion input terminal of the operational amplifier 205, gradually increases up to the reference voltage KVC. Meanwhile, as shown in FIG. 5, the signal $\overline{iRON}$ produced from the Johnson counter "a" is turning on and off in a repeating manner. The transistor 219, therefore, also turns on and off in synchronism with the signal $\overline{iRON}$ to bring the strobe terminal of the operational amplifier 205 into an open state and short-circuit state.

As a result of that, the operational amplifier 205 operates in synchronism with the signal $\overline{iRON}$ and the light emitting element iRED also flickers synchronously with the signal $\overline{iRON}$. Accordingly, the element iRED lights up at given intervals and the output thereof gradually increases.

When the signal light of the light emitting element iRED is reflected and comes to the PSD 145, a current is produced from the terminal A of the PSD as the other terminal B of the PSD has been opened by the signal $\overline{OPEN}$. Ih the current produced from the terminal A, a current portion corresponding to the background light component stored at the capacitor 148 is allowed to flow to the Miller circuit "f". Meanwhile, a signal current largely consisting of the output of the element iRED is converted into a voltage by the operational amplifier 147 and the feedback system 146. A signal voltage thus obtained is applied via the capacitor 171 to the non-inversion input terminal of the operational amplifier 175 to be amplified there.

The output of the operational amplifier 175 produced at the points of time when the element iRED lights up and not lights up is sampled by the signals $\overline{EPI1}$ and $\overline{SPL2}$ which are taken out from the output of the Johnson counter "a" as shown in FIG. 5. The output obtained when the element iRED lights up is held by the capacitor 179 and the buffer 180 while the output obtained when the element iRED does not light up is held by the resistor 181, the capacitor 182 and the buffer 183 respectively. The output obtained when the element iRED is not alight is further inverted; then, subjected to addition by the operational hamplifier 191, and is again inverted. The output of the operational amplifier 191 gradually increases according as the quantity of light projected from the element iRED 203 increases. When it comes to exceed a level set at the inversion terminal of the comparator 194, the output level of the comparator 194 changes from a high level to a low level. The RS-FF 197 is set and produces a high level signal from its terminal Q. The level of the signal AFST changes from a low level to a high level. Then, a positive pulse signal AFSTB is produced via a differentiation circuit consisting of the capacitor 198 and the resistor 199. The signal AFSTB causes, via the OR gate 115 of the digital control system C, the binary counter 118 to be again reset. Concurrently with this, the signal AFST comes via the resistors 213 and 214 to the base of the transistor 212. Then, with the output current of the Miller circuit "g" allowed to flow to the transistor 212, the transistor 206 is turned off to stop the capacitor 208 from being charged and to make the output of the operational amplifier 205 unvarying. By this, the output of the light emitting element iRED 203 is kept unvarying.

The level of the output from the terminal Q6 of the counter 118 becomes high a given length of time after the counter 118 is again reset and the level of the signal AFST supplied to one of the input terminals of the NAND gate 119 is also high. Therefore, the output level of the NAND gate 119 becomes low. The RS-FF 120 is set and the level of the output Q of the RS-FF 120 becomes high. The level of the signal $\overline{OPEN}$ thus becomes high. The signal $\overline{OPEN}$ is supplied to the base of the transistor 140 via the inverter 37 and the resistors 138 and 139. The transistor 140 turns off. The output current of the Miller circuit "b" flows to the base of the transistor 141 to turn it on. The output current of the PSD 145 then begins to flow from the terminals A and B of the PSD 145. Then, at the point of time when the terminal B of the PSD 145 is not opened, a current component allowed to flow from the inversion input terminal side of the operational amplifier 147 to the transistor 150 for the purpose of suppressing the DC-component of the output current of the PSD 145 is divided between the terminals A and B of the PSD 145. Therefore, the current component flowing from the inversion input terminal side to the transistor 150 for the purpose of DC component suppression must be changed. When the signal $\overline{OPEN}$ becomes a high level, it causes the signal ASWON to become a high level via the AND gate 134 and the OR gate 135. The capacitor 148 is then repeatedly charged and caused to discharge in the same manner as mentioned in the foregoing. The current of the Miller circuit "f" and the current flowing from the terminal B of the PSD 145 to the transistor 150 become equal to each other. Then, the output level of the terminal Q8 of the counter 118 becomes high a given length of time after the counter 118 is again reset. This causes the output level of the NAND gate 122 to become low. The level of the output Q of the RS-FF 127 becomes low. The output level of the AND gate 134 also becomes low. Accordingly, the output level of the AND gate 169 becomes low and that of the NAND gate 168 high. As a result of that, the capacitor 148 is stopped from being charged and caused to discharge in the same manner as mentioned in the foregoing. The current of the Miller circuit "f" is thus kept unvarying. At that time, the element iRED is caused to be alight by the same voltage as the voltage obtained immediately before the counter is again reset. As shown at a part VA+VB in FIG. 6, the output from the terminal B of the PSD 145 caused by the reflection light from an object to be photographed is divided between the two terminals A and B according to the position of the incident point of the signal light. As a result, the output from the terminal B of the PSD 145 becomes smaller than the output produced immediately before the counter is again reset. With the output level of the terminal Q8 of the binary counter 118 having become high, when the output level of the terminal Q7 again becomes low, the RS-FF 129 is reset. The AND gate 136 then causes the signal VAON to become a high level. The analog switch ASW 195 turns on to give an output VA which is processed by the light receiving part-and-signal processing system A via the resistor 196, the capacitor 200 and the buffer 201. The output VA is information corresponding to the location of an incident light point on the PSD 145. Therefore, a distance measuring device can be obtained by providing some converting means that converts the output VA into distance measurement information.

In the first embodiment given in the foregoing, a signal VA+VB and a signal VA are obtained along with a signal VA/(VA+VB) which is obtained as normalized information. Whereas, in the case of the third embodiment described above, the normalized information is obtained with the signal VA detected when the signal VA+VB produced from the light receiving part-and-signal processing system A is made unvarying by raising the output of the light projecting element iRED. This method of making the signal VA+VB unvarying for obtaining the normalized information may be replaced with a method of varying the degree of amplification by the signal processing system arranged to amplify the signal obtained at the light receiving part.

In this specific embodiment, the charging and discharging actions on the capacitor 148 by the Miller circuits "c", "d" and "e" are used for preventing the influence of a DC component with which the PSD is irradiated; and a resultant current is allowed to flow to the ground before the output of the PSD is supplied to the signal processing system by the operation of the Miller circuit "f". However, this method for suppressing the DC component may be replaced with some other suitable method, such as a method shown in FIG. 6 of Japanese Laid-Open Patent Application No. SHO 57-182112.

Further, in this specific embodiment, the switching means is composed of the inverter 137, resistors 138, 139 and 142 and transistors 140, 141, 143 and 144. A signal processing circuit is composed of the parts of the light receiving part-and-signal processing system A other than the switching means and the PSD. Meanwhile, control means is arranged in the form of a digital control system.

Figure 7:
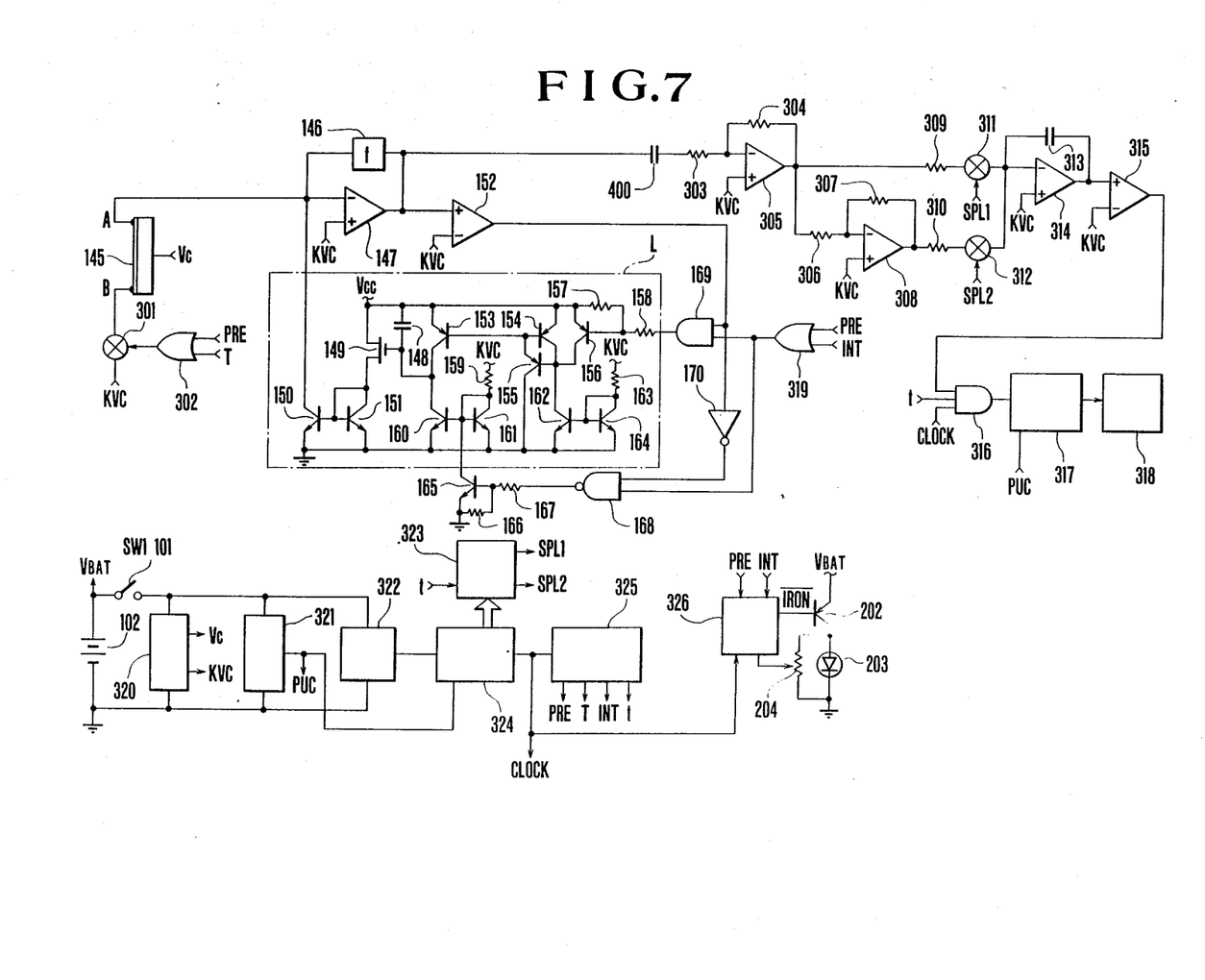
FIG. 7 is a circuit diagram showing a fourth embodiment of the invention.

A fourth embodiment of the invention is arranged as shown in FIG. 7.

Referring to FIG. 7, the circuit elements which operate in the same manner as the corresponding elements of the embodiment shown in FIG. 4 are indicated by the same reference numerals and symbols as in FIG. 4 and they are omitted from description here. In the circuit diagram of FIG. 7, an analog switch 301 is connected to the terminal B of the PSD 145. An OR gate 302 is arranged to produce an OR output obtained from signals PRE and T which will be described later. An operational amplifier 305 forms in conjunction with resistors 303 and 304 an amplifier which amplifies an input signal to a suitable magnitude. An amplifier 308 is arranged to operate in conjunction with resistors 306 and 307. Elements 311 and 312 are arranged to perform the same function as the analog switches (ASW) 176 and 177 shown in FIG. 4. An operational amplifier 314 forms an integrator in conjunction with a capacitor 313. A comparator 315 is arranged to detect the output level of the integrator formed by the operational amplifier 314 and the capacitor 313. An AND gate 316 is arranged to produce an AND output obtained from the output of the comparator 315, a signal CLOCK and a signal "t". A counter 317 is arranged to count clock pulses produced from the AND gate 316. An AF signal generating circuit 318 is arranged to produce distance measurement information on the basis of the count value of the counter 317. A reference voltage source 320 is arranged to generate reference voltages VC and KVC. A power-up-clear pulse generating circuit 321 is arranged to generate a power-up-clear pulse PUC when a switch (SWl) 101 turns on. As oscillator 322 is arranged to generate basic clock pulses for the digital control system. A counter 324 is arranged in the same manner as the Johnson counter of FIG. 4. A gate circuit 323 is arranged to produce signals SPL1 and SPL2 obtained from the signal of the counter 324 for driving analog switches 311 and 312 with these signals SPL1 and SPL2. The gate circuit 323 inverts the phases of the signals SPL1 and SPL2 relative to the phase of a signal iRON from an iRED driving circuit 326 in accordance with the levels of signals T and t which will be described later. A sequence signal generating circuit 325 is arranged to generate signals PRE, T, iNT and t. The signal PRE is arranged to turn on the analog switch 301 to inhibit the light emitting element iRED 203 from lighting up and to cause the DC suppression level of the DC suppression circuit L to be stored. The signal T is arranged to cause the analog switch 301 to be on for a predetermined period of time, to have an AC signal corresponding to a signal A component thus produced from the terminal A of the PSD and, at the same time, to cause the integrator to perform an integrating operation for a predetermined period of time by driving the analog switches 311 and 312. The signal iNT is arranged to shift the storing level of the DC suppression circuit L. The signal "t" is arranged to be supplied to the gate circuit 323, to invert thereby the phases of the signals SPL1 and SPL2 which are produced for driving the analog switches 311 and 312, to render the AND gate 316 active and to cause thereby the counter 317 to count the clock pulses.

The above-stated iRED driving circuit 326 is arranged to produce a signal $\overline{\text{iRON}}$ which turns on the transsistor 202 when the signals PRE and iNT are at low levels.

Figure 8:
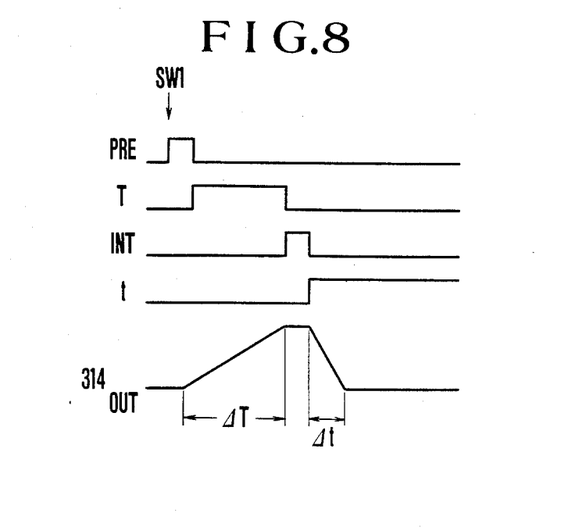
FIGS. 8 and 9 are time charts showing the operation of the fourth embodiment.

The fourth embodiment which is arranged as described above operates as follows: When the switch SWl (101) is closed, the signal PUC is generated from the PUC generating circuit 321. The counter circuits 324 and 317 are initially reset. The reference voltages VC and KVC are generated. Following that, the sequence signal generating circuit 325 comes to produce the signal PRE at the timing as shown in FIG. 8. This causes via the OR gate 302 the analog switch 301 to turn on. This signal PRE is supplied to the iRED driving circuit 326 to inhibit the light emitting element iRED 203 from lighting up. Accordingly, the terminal A of the PSD 145 produces an external light DC component of the side A. The current thus produced is converted into a voltage by the current-to-voltage converting amplifier 147. If the DC voltage component thus obtained is large, the output level of the comparator 152 becomes low. Then, since the signal PRE has rendered the output level of the OR gate 319 high at that instant, the DC component of the side A of the PSD 145 is cancelled through the current Miller circuit (150 and 151) in the same manner as in the case of the first embodiment.

Figure 9:
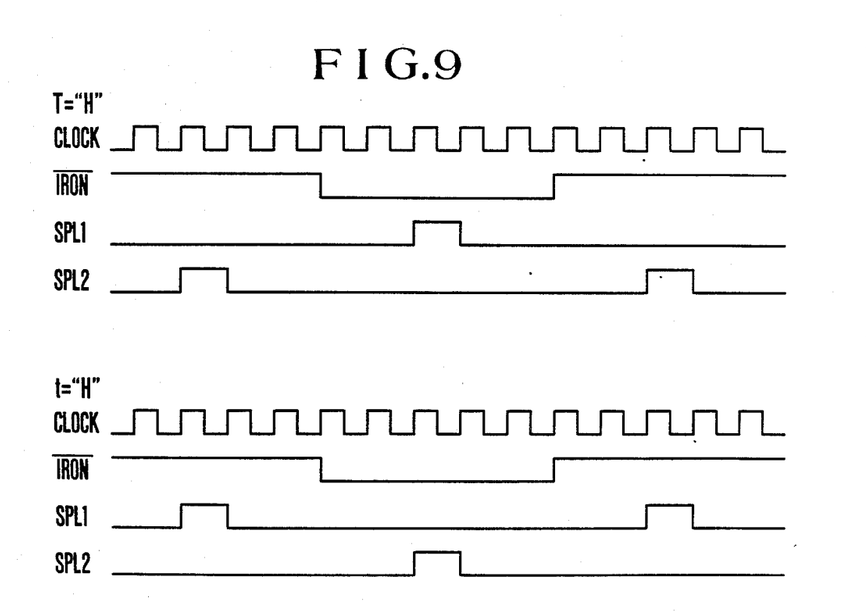

When the level of the signal PRE changes to a low level as shown in the timing chart of FIG. 8, the output level of the OR gate 319 also changes from a high level to a low level. Therefore, in the same manner as in the first embodiment, the DC cancel level at this point of time is stored and held at the capacitor 148 as the gate voltage of the P-channel FET 149. The instant the signal PRE changes from a high level to a low level, the light emitting element iRED 203 begins to perform a flickering action in synchronism with the clock signal. Then, the light projected from the light emitting element iRED 203 and reflected by an object to be photographed comes to the PSD 145. Meanwhile, concurrently with the change of the level of the signal PRE from a high level to a low level, the level of the signal T changes from a low level to a high level. The OR gate 302 remains at a high level to keep the analog switch 301 on. The terminal A, therefore, produces an AC signal corresponding to a signal component A. The AC signal is converted to a voltage by the amplifier 147 and the feedback circuit 146. The signal voltage thus obtained is amplified by the pre-amplifier 305. The signal voltage is also inverted and amplified by the operational amplifier 308. The analog switches 311 and 312 are caused to alternately turn on and off by the signals SPL1 and SPL2 in synchronism with the flickering operation of the element iRED 203. The Miller integrator comes to be charged and the output of the operational amplifier 314 begins to increase. Referring to FIG. 8, after the lapse of a predetermined period of time ΔT, the level of the signal T becomes low and that of the signal iNT changes to a high level. Accordingly, the output level of the OR gate 302 changes from a high level to a low level to turn off the analog switch 301. At that point of time, the output of the operational amplifier 314 becomes a signal obtained by integrating for a predetermined period of time the signal A produced from the terminal A of the PSD. The instant the signal iNT changes from the low level to the high level, the DC suppression circuit L again begins to operate. At this point of time, the signal T is not produced. Therefore, the analog switch 301 remains off. Accordingly, the terminal A of the PSD produces a signal corresponding to the whole of a light flux incident on the whole surface of the PSD. Compared with the signal produced when the analog switch 301 is on, therefore, a larger DC signal is produced. Then, to cancel it, the circuit operates to cause the larger one of the currents produced from the terminal A of the PSD to flow to the transistor 150. When the signal iNT becomes a low level, the output level of the OR gate 319 becomes low to stop the DC suppression circuit L from operating. Then, the level of ambient light existing at that point of time is stored at the capacitor 148 in the form of a gate voltage of the FET 149. Further, with the level of the signal iNT changed to the low level, the element iRED 203 resumes its flickering operation. At that instant, the signal "t" changes from a low level to a high level. Then, as shown in FIG. 9, the phases of the signals SPL1 and SPL2 are reversed to cause the Miller integrator to perform reverse integration. As a result of that, the output level of the operational amplifier 314 becomes low as shown at a part "314 OUT" in FIG. 8.

When the output of the operational amplifier 314 becomes lower than the reference voltage KVC, the output level of the comparator 315 becomes low. During the period Δt of FIG. 8 between the change of the signal "t" to the high level and the change of the output of the comparator 315 to the low level, the clock signal is supplied via the AND gate 316 to the counter 317 and the counter counts the clock pulses. During this period, the terminal A of the PSD produces a signal corresponding to the whole current to be produced from both terminals of the PSD, i.e. a sum signal (A+B). With regard to periods ΔT and Δt shown in FIG. 8 and the signals (A+B) and (A), there obtains the following relation:

$$\Delta T(A) = \Delta t(A+B)$$

Therefore, by measuring Δt, the following can be obtained:

$$\Delta t = \frac{(A)}{(A+B)} \Delta T$$

Since ΔT is a predetermined period of time, Δt which is the count value of the counter is independent of the magnitude of the signal produced from the PSD. Therefore, it becomes a signal corresponding to the incident position of the reflection light incident on the PSD resulting from the light of the element iRED. In other words, the count value of the counter 317 becomes a signal obtained by normalizing the signal produced from the PSD. The AF signal generating circuit 318 which is disposed in the next stage then produces distance measurement information on the basis of the count value of the counter 317.

In this specific embodiment, the circuit arrangement is simplified as the signal processing circuit for the signal of the PSD is arranged by applying the so-called double integration. In this embodiment, the kind of light to be emitted from the light projecting element of course may be selected from the group consisting of visible rays, infrared rays, etc. irrespective of their wave length. As for the light projecting element, a laser diode which is capable of continuously oscillating at normal temperature, for example, may be employed. Further, in the embodiment given, the invention is applied to a one-dimensional PSD. However, in case of a two-dimensional PSD having two pairs of output terminals arranged in the directions of X and Y axes, the number of signal processing circuits which has heretofore been four in such a case can be reduced to two in accordance with the invention. Therefore, the advantage of the invention will be furthered by applying it to a two-dimensional PSD.

As described in the foregoing, the invention obviates the necessity of separately providing a signal processing circuit for each of the pair of or pairs of output terminals. In accordance with the invention, the signal processing circuit is required only for one of the paired output terminals. This advantage permits reduction in size, simplification of structural arrangement, improvement in accuracy and reduction in power consumption of a signal processing circuit for a position sensitive detector.

Further, in the embodiment, the arrangement for the DC suppression circuit which compensates for DC current component resulting from ambient light to shift the storing level between a level for the process of obtaining a sum signal output from one of the terminals of the PSD while the other terminal is opened and another level for the process of obtaining a signal from one of the terminals without opening the other gives the above-stated advantageous effect on the PSD signal processing circuit. This arrangement is advantageously applicable also to other signal processing circuits of different types. For example, such applicable types include a method in which, as disclosed in Japanese Laid-Open Patent Application No. SHO 51-129225, two photo-sensitive elements are adjacently arranged in place of the PSD; then, by utilizing the fact that the outputs of these photo-sensitive elements oppositely vary according to the incident position of a reflection light coming from an object to these elements, the incident position of the reflection light is detected. In arranging such a DC suppression circuit as that of this embodiment for the signal processing circuit of the two photo-sensitive elements of the above-stated Japanese Laid-Open Patent Application No. SHO 51-129225, only one DC suppression circuit may be arranged instead of two, because the DC suppression can be accomplished as mentioned above by shifting the storing level from one level to another for detecting the output of either one of the two photosensitive elements.

What we claim:

1. For a position sensitive detector having two terminals and producing at the terminals respective signals varying oppositely as the position of light striking the detector varies, a signal processing circuit comprising:
    (a) switching means shiftable between a first state in which the switching means opens the one of two terminals of said position sensitive detector and a second state in which the one terminal is not open;
    (b) signal processing means for processing an output of said position sensitive detector produced when said switching means is in said first state and another output of said position sensitive detector produced when said switching means is in said second state and for producing normalized light-point position information; and
    (c) control means for controlling said signal processing circuit and said switching means.

2. A signal processing circuit according to claim 1, wherein said signal processsing means includes:
    (a) storing means for storing a signal produced at the other output terminal of the position sensitive detector when said switching means is in said first state; and (b) normalizing means for normalizing another signal produced at the other output terminal of the position sensitive detector when said switching means is in said second state with said stored signal stored by said storing means.

3. A signal processing circuit according to claim 1 or 2, wherein said switching means is a transistor connected to said one of the output terminals of the position sensitive detector.

4. A signal processing circuit according to claim 1 or 2, wherein said switching means is an FET connected to said one of the output terminals of the position sensitive detector.

5. A distance measuring device using a position sensitive detector producing from two terminals thereof two signals varying oppositely as the position of light incident thereon varies, said device comprising:

(a) light projecting means;

(b) said position sensitive detector being arranged a base length away from said light projecting means;

(c) switching means disposed at one of the two output terminals of said position sensitive detector, said switching means being shiftable between a first state in which said one of the output terminals is open and a second state in which said one of the output terminals is not open; and (d) a signal processing circuit arranged to process a signal produced from the other output terminal of said position sensitive detector, said signal processing circuit including:

(a) control means for bringing said switching means into said first state and into said second state after a lapse of a predetermined period of time, and (b) computing means for obtaining, by computation, light-point position information showing an incident point on the position sensitive detector at which light projected from the light projecting means and reflected by an object to be photographed is received, said information being thus computed and obtained from a signal produced from the other output terminal of the position sensitive detector when the switching means is in the first state and another signal produced from the other output terminal when the switching means is in said second state.

6. A signal processing circuit for light receiving means producing two output currents which oppositely vary as the position of light incident thereon varies, said signal processing circuit comprising:

(a) a signal processing circuit at a first terminal of said light receiving means;

(b) a control circuit at a second terminal of said light receiving means and including an openable switching element in series with said second terminal and capable of bring said second terminal into an open state; and (c) control means for controlling said switching element to open said switching element.

7. A distance measuring device for measuring a distance to an object by means of a position sensitive detector which produces from two terminals thereof two signals varying oppositely according to the position of light incident thereon, said device comprising;

(a) light projecting means capable of permitting control over the intensity of light to be projected therefrom;

(b) said position sensitive detector being disposed a base length away from said light projecting means;

(c) switching means at one of the output terminals of said position sensitive detector, said switching means being shiftable between a first state in which said output terminal is opened and a second state in which said output terminal is not opened;

(d) a signal processing circuit for processing a signal produced from the other output terminal of said position sensitive detector, said signal processing circuit including:

(a) control means for shifting said switching means to said first state and from said first state to said second state after a lapse of a predetermined period of time, (b) control means for controlling the intensity of the light projected from the light projecting means to keep the level of a signal produced from the other output terminal of the position sensitive detector unvarying by detecting said level when said switching means is in the first state and for controlling said signal to be at a constant level without changing the intensity of the light projected when said switching means shifts from said first state to said second state, (c) detecting means for detecting the level of the signal produced from the other output terminal of the position sensitive detector when said switching means shifts from the first state to the second state; and (e) conterting means for converting the signal level detected by said detecting means into a distance measurement signal.

8. A signal processing circuit for a position sensitive detector according to claim 1, further comprising:

(a) compensating means for detecting the level of a DC component, due to ambient light, in a signal corresponding to the output of the other output terminal of the position sensitive detector and to compensate for the DC component of the output of the position sensitive detector according to a compensating level corresponding to said level detected; and (b) switch-over means arranged to switch the compensating level of said compensating means from one level to another in response to the shift of the position of said switching means when the switching means is shifted by said control means from the first stae to the second state.

9. A distance measuring device according to claim 5, further comprising:

(a) compensating means for detecting the level of a DC component, due to ambient light, in a signal corresponding to the output of the other output terminal of the position sensitive detector and to compensate for the DC component of the output of the position sensitive detector according to a compensating level corresponding to said level detected; and (b) switch-over means for switching the compensating level of said compensating means from one level to another in response to the shift of the position of said switching means when the switching means is shifted by said control means from the first state to the second state thereof.

10. A distance measuring device according to claim 5, further comprising:
 (a) detecting means for detecting a start of the operation of the distance measuring device; and
 (b) compensating means for detecting the level of a signal component, due to ambient light, in a signal corresponding to the output of the position sensitive detector a predetermined period of time after the start of operation of the distance measuring device is detected by said detecting means and for compensating for removal of the influence of the ambient light on the output of the position sensitive detector according to a compensation level corresponding to the level detected.

11. A signal processing circuit for processing the signal of light receiving means which is used in an automatic focusing device of a camera and is arranged to produce an output current representing a position of light incident thereon, said signal processing circuit comprising:
 (a) holding means, coupled to a path of the output current of said light receiving means, for detecting a level of a signal component due to ambient light based on the output current of said light receiving means, and for holding a signal corresponding to the level of said signal component, said holding means performing a holding operation after a shutter release switch of the camera has shifted to a state for causing an exposure operation to be carried out; and
 (b) switch means, also coupled to the path of the output current of said light receiving means, for flowing a portion of the output current in an amount corresponding to the signal level held in said holding means, whereby the output current flowing through the path is decreased by an amount corresponding to the amount of the current flowing to said switch means, and the automatic focusing device is controlled on the basis of the amount of the output current passing through said output current path.

12. A signal processing circuit for processing the signal of light receiving means arranged to produce two output currents which oppositely vary as the incident position of light on the light receiving means varies, said signal processing circuit comprising:
 (a) a changeover circuit for time-serially changing over the output state of the output currents from said light receiving means from a first output state to a second output state;
 (b) a correction amount setting circuit for setting a correction amount by detecting the DC component contained in the output current based on the ambient light when said light receiving means operates in said first output state, and responsive to changeover from the first to the second output state by said changeover circuit for setting a new correction amount instead of the correction amount set when in the first output state by detecting said DC component in the second output state; and
 (c) a correction circuit operating so that when in the first output state, the output current of said light receiving menas is corrected in correspondence to the correction amount for the first output state set in said setting circuit to obtain a first corrected output, and when in the second output state, the output current of said light receiving means is corrected in correspondence with the correction amount for the second output state set in said setting circuit to obtain a second corrected output.

* * * * *